United States Patent
Watanabe

(10) Patent No.: US 9,973,699 B2
(45) Date of Patent: May 15, 2018

(54) IMAGE PROCESSING APPARATUS AND IMAGE PROCESSING METHOD

(71) Applicant: CANON KABUSHIKI KAISHA, Tokyo (JP)

(72) Inventor: Takeshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/132,878

(22) Filed: Apr. 19, 2016

(65) Prior Publication Data
US 2016/0316122 A1 Oct. 27, 2016

(30) Foreign Application Priority Data
Apr. 21, 2015 (JP) ................. 2015-087146

(51) Int. Cl.
*H04N 5/232* (2006.01)

(52) U.S. Cl.
CPC ....... *H04N 5/23258* (2013.01); *H04N 5/2328* (2013.01); *H04N 5/23267* (2013.01); *H04N 5/23212* (2013.01)

(58) Field of Classification Search
CPC ............. H04N 5/23258; H04N 5/2328; H04N 5/23267; H04N 5/23212
See application file for complete search history.

(56) References Cited

U.S. PATENT DOCUMENTS

| 2009/0096897 | A1* | 4/2009 | Saito | H04N 5/232 348/241 |
| 2011/0013031 | A1* | 1/2011 | Miyasako | G02B 27/646 348/208.99 |
| 2014/0037269 | A1* | 2/2014 | Kumar | G06K 9/00765 386/286 |

FOREIGN PATENT DOCUMENTS

JP    11-136557 A    5/1999

* cited by examiner

*Primary Examiner* — Mekonnen Dagnew
(74) *Attorney, Agent, or Firm* — Canon U.S.A., Inc. IP Division

(57) ABSTRACT

An image processing apparatus, which captures and records a moving image and which can generate still image data from moving image data, evaluates validity of image capturing conditions related to imaging parameters such as focus, exposure, white balance, and image blur, generates a degree of appropriateness corresponding to each imaging parameter, and based on at least one of the degrees of appropriateness, changes characteristics of control of imaging parameters corresponding to the other degrees of appropriateness.

5 Claims, 12 Drawing Sheets

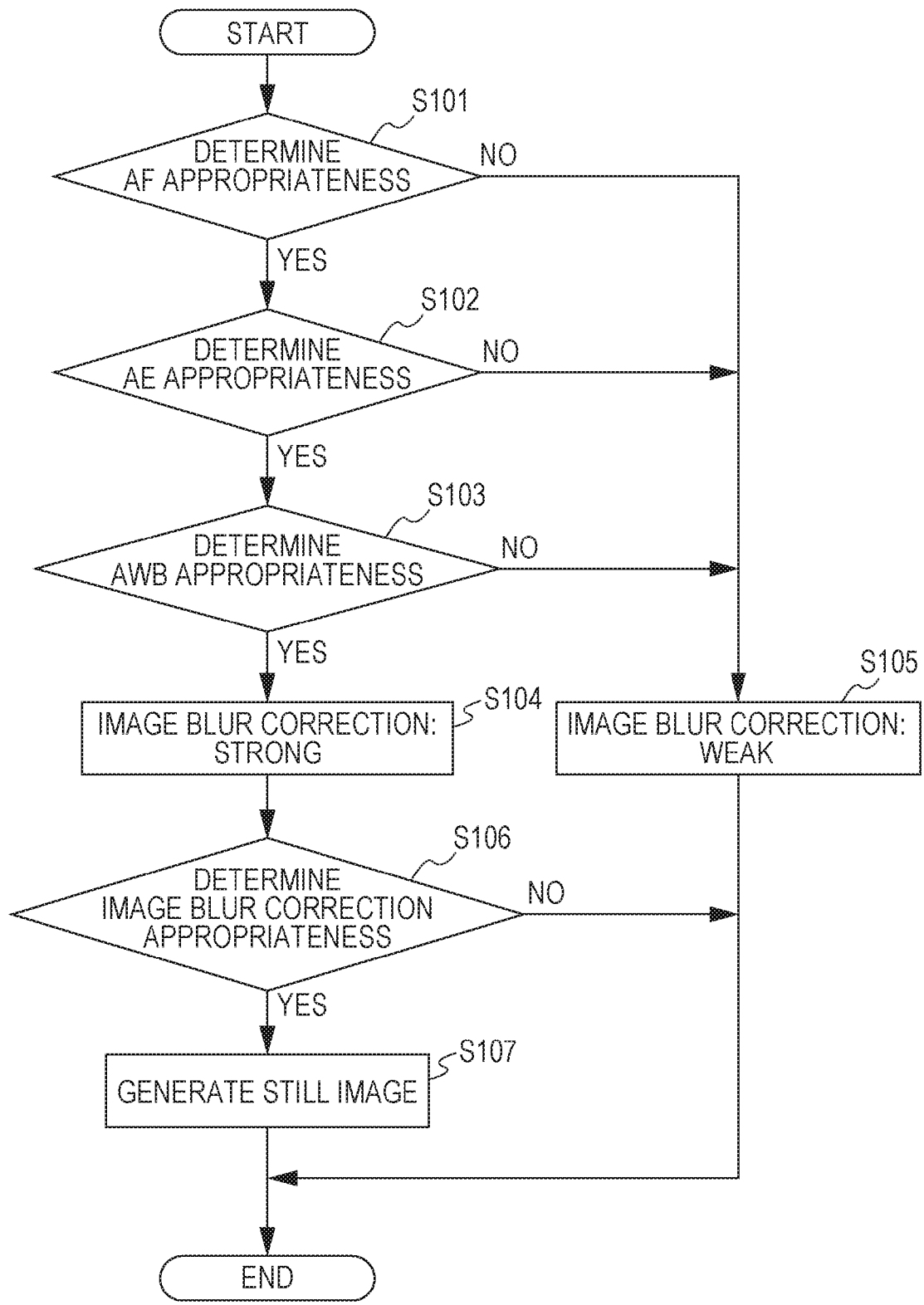

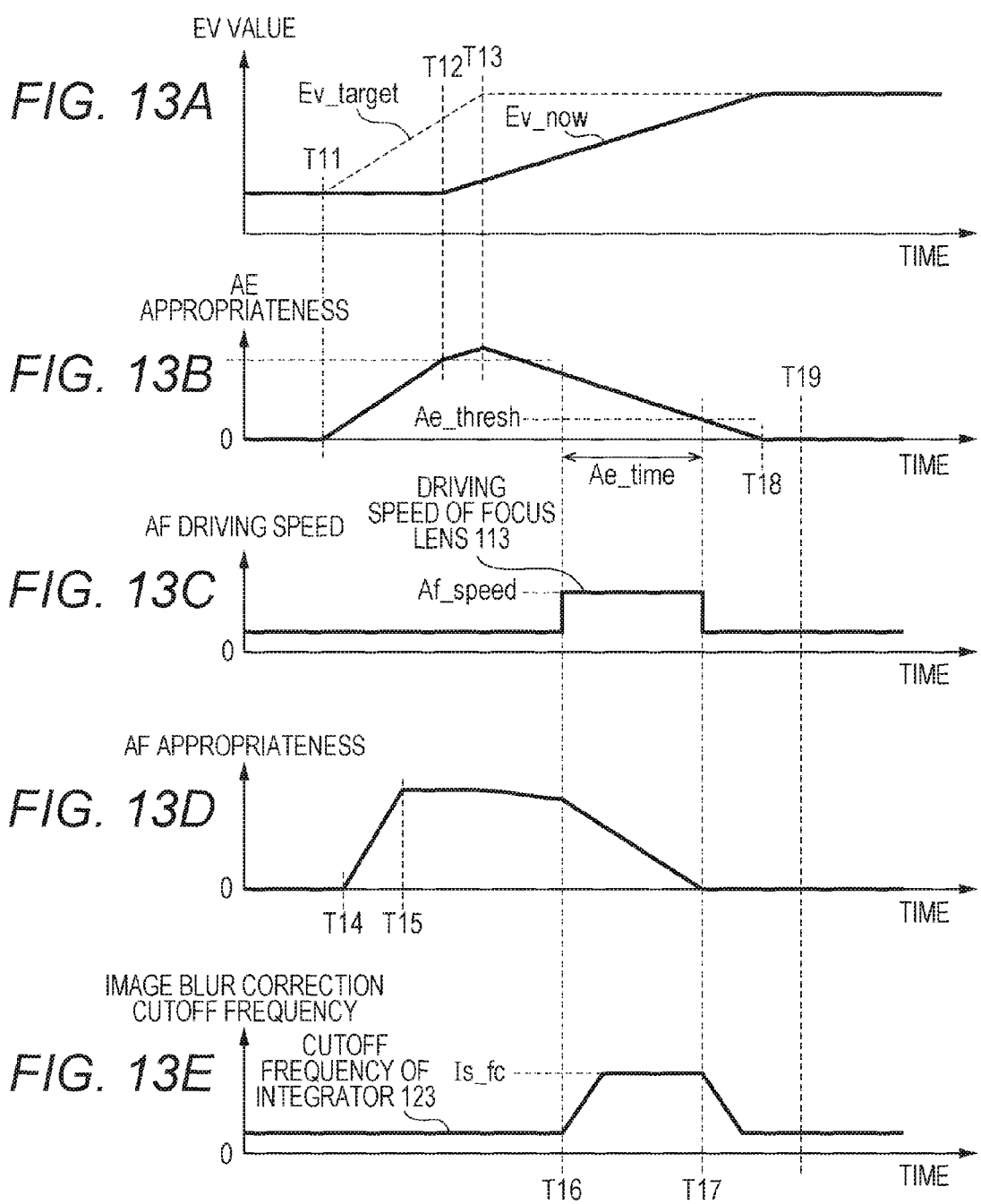

IMAGE PROCESSING APPARATUS AND IMAGE PROCESSING METHOD

BACKGROUND OF THE INVENTION

Field of the Invention

The present disclosure generally relates to image processing, and more particularly, to an image processing apparatus applied to an image capturing apparatus, such as a digital video camera that generates a still image from a captured moving image, and an image processing method to obtain still image data which is in a good photographing condition.

Description of the Related Art

In recent years, the number of pixels of an image capturing apparatus that can capture a moving image is increasing rapidly. An image capturing apparatus that captures a moving image of a full HD (high definition) size has become widely used, and image capturing apparatuses that can capture a 4K2K moving image gradually appear on the market.

Because of such higher definition of moving image, an image of each frame of a moving image has a number of pixels sufficient to be used as a still image. Therefore, it is considered that a method to generate a still image from each frame of a moving image will be more prevalent.

A problem when generating a still image from a moving image is that it is difficult for a user to determine which frame is an optimal image as a still image.

For example, blur and defocus of an image are not perceived when the image is seen as a moving image because the image moves at all times, and such blur and defocus are often an unacceptable level when the image is seen as a still image.

It is very troublesome work for a user to check the image frame by frame.

To solve such a problem, for example, in Japanese Patent Application Laid-Open No. 11-136557, an evaluation is performed based on information such as focus and exposure and photographing condition information such as image blur obtained from an angular velocity sensor.

A technique is disclosed which generates still image data by automatically selecting a frame image whose evaluation value is high or which satisfies a certain condition.

However, in the conventional example described above, a frame whose evaluation value has resulted to be high is merely selected from a photographed video image, and a probability that a frame with a high evaluation value appears largely depends on a photographing technique of a user and a photographing situation.

Further, it is considered that a probability that a plurality of evaluation values, such as focus, exposure, and image blur, are all high is lower. Therefore, obtaining a good still image may be difficult depending on a skill of a photographer and a situation of photographing.

The present disclosure is made in view of the above concerns, and the present disclosure provides an image processing apparatus that can easily generate an optimal image as a still image when generating the still image from a moving image.

SUMMARY OF THE INVENTION

According to an aspect of the present disclosure, an image processing apparatus includes an evaluation unit configured to evaluate validity of an imaging parameter acquired from image data outputted from an image capturing element that captures a subject image and generate an evaluation value of the imaging parameter; a generation unit configured to generate shake correction data by using shake data outputted from a shake detection unit; a control unit configured to control an image blur correction unit by using the shake correction data; a changing unit configured to cause, when photographing a moving image, an image blur correction performance of the image blur correction unit in a case of the evaluation value of the imaging parameter being close to a target value of the imaging parameter to be greater than the image blur correction performance of the image blur correction unit in a case of the evaluation value of the imaging parameter being far from the target value of the imaging parameter; and a recording unit configured to record a frame image whose image blur correction performance exceeds a predetermined threshold value as still image reproduction data.

Further features of the present disclosure will become apparent from the following description of exemplary embodiments (with reference to the attached drawings).

BRIEF DESCRIPTION OF THE DRAWINGS

FIG. 9 is a flowchart for explaining processing of an image capturing characteristic control unit 105.

FIGS. 13A to 13E are time charts according to a third embodiment of the present disclosure.

DESCRIPTION OF THE EMBODIMENTS (First Embodiment)

Figure 1:
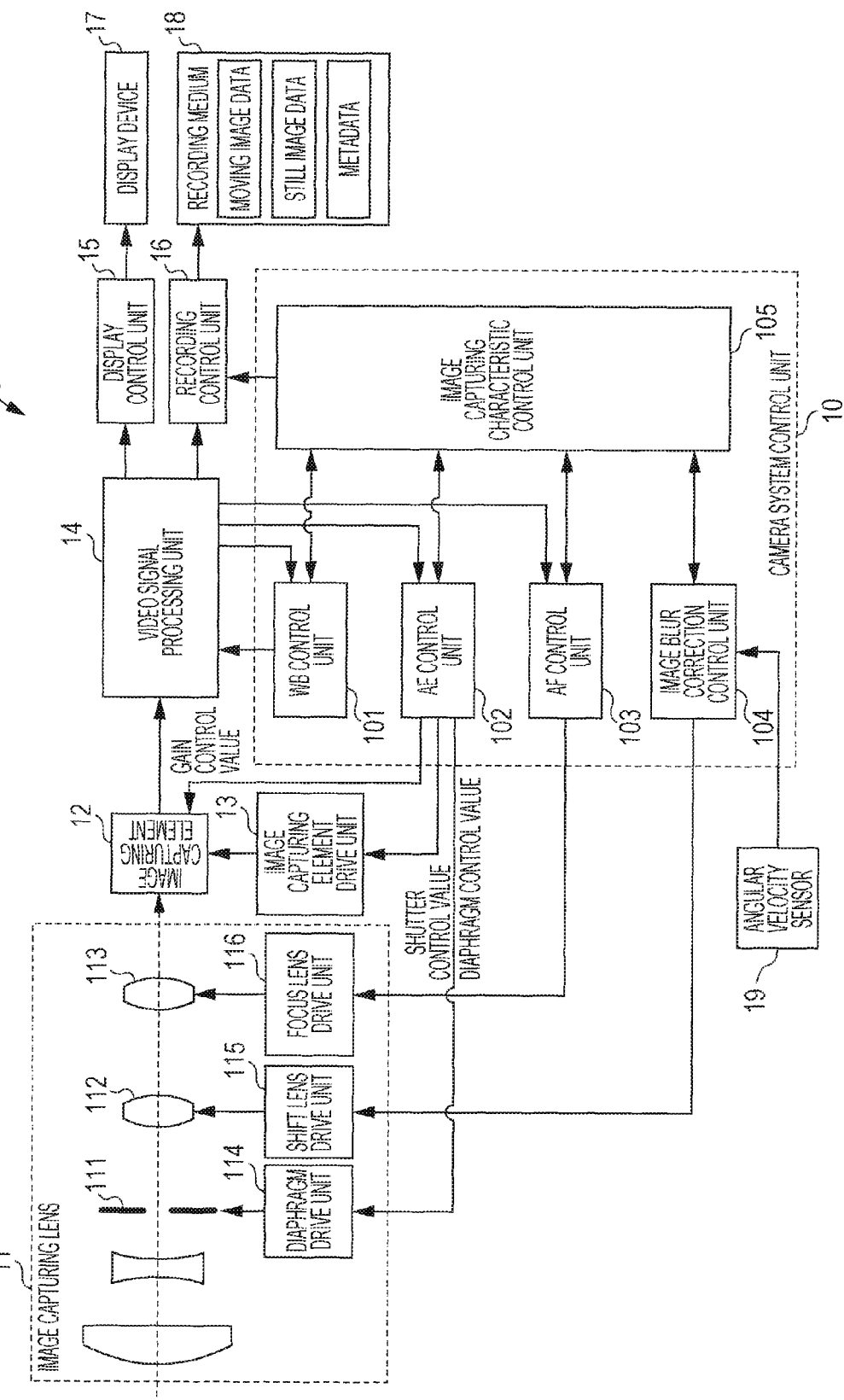
FIG. 1 is a block diagram showing a configuration example of an image capturing apparatus according to an embodiment of the present disclosure.

First, an entire configuration of an image capturing apparatus according to a first embodiment of the present disclosure will be described. FIG. 1 is a block diagram schematically showing a configuration example of an image capturing apparatus 1 according to the first embodiment of the present disclosure.

In FIG. 1, a camera system control unit 10 is a block for controlling an entire operation of the image capturing apparatus 1. As used herein, the term "unit" generally refers to any combination of software, firmware, hardware, or other component, such as circuitry, that is used to effectuate a purpose.

The camera system control unit 10, which is an image processing apparatus, includes, for example, a CPU (central processing unit), which may include one or more processors, a RAM (random access memory), and a ROM (read only memory), and controls the image capturing apparatus 1 according to a program that is stored in the ROM in advance while using the RAM as a work area.

Each processing step described later is mainly performed as a computer program (software) by the camera system control unit 10.

The camera system control unit 10, which is the image processing apparatus, includes a WB (white balance) control unit 101 that performs white balance adjustment processing and an AE (auto exposure) control unit 102 that performs automatic exposure control processing.

Further, the camera system control unit 10, which is the image processing apparatus, includes an AF (auto focus) control unit 103 that performs automatic focus adjustment processing and an image blur correction control unit 104 that performs control of image blur correction.

The camera system control unit 10 controls image capturing condition, such as exposure, white balance, focus, and image blur of a captured image, to be an appropriate condition by controlling an image capturing lens 11, an image capturing element 12, and a video signal processing unit 14.

Further, the camera system control unit 10 includes an image capturing characteristic control unit 105 that monitors photographing conditions related to the control performed in the WB control unit 101, the AE control unit 102, the AF control unit 103, and the image blur correction control unit 104 and changes control characteristics of each control unit according to each photographing condition.

The image capturing characteristic control unit 105 is a block to be able to generate a good still image with higher probability when generating a still image from a moving image by controlling all the control units so that each photographing condition is a suitable condition as much as possible.

The details of operations performed in each block of the camera system control unit 10 will be described later.

As the image capturing lens 11, it is possible to apply a conventional general image capturing lens having functions such as zoom, focus, diaphragm, and image blur correction. A diaphragm 111 has a plurality of diaphragm blades. The diaphragm 111 is one of exposure control units that form a light passage opening and changes the exposure.

These diaphragm blades is operated by receiving a driving force of an diaphragm drive unit 114 and adjust the amount of light entering the image capturing element 12 by variably changing the opening area (diaphragm diameter).

A shift lens 112 is a lens that can move in a direction perpendicular to the optical axis. The shift lens 112 can move the position of a subject image to be formed.

The shift lens 112 is moved by receiving a driving force from a shift lens drive unit 115. It is possible to correct image blur of a captured image by moving the shift lens 112 so as to cancel a shake applied to the image capturing apparatus.

A focus lens 113 is moved in the optical axis direction by receiving a driving force from a focus lens drive unit 116. The focus lens 113 performs focus adjustment of a subject image formed on the image capturing element 12 by stopping at a predetermined focus position.

The image capturing element 12 includes, for example, a CMOS (Complementary Metal Oxide Semiconductor) image sensor of an XY address method.

The image capturing element 12 accumulates electric charges by photoelectrically converting an optical image formed by the image capturing lens 11 and supplies an image signal including a plurality of pixels to the video signal processing unit 14 by reading the electric charges.

The image capturing element 12 is driven by an image capturing element drive unit 13 and operates so as to capture a subject image at a cycle of 60 Hz in the case of, for example, a video signal based on the NTSC (National Television System Committee) format.

The image capturing element 12 can sweep out the accumulated electric charges by a control signal from the image capturing element drive unit 13 and has an electronic shutter function that, thereby, controls an exposure time (an accumulation time).

Further, the image capturing element 12 has a gain unit that electrically amplifies a signal when reading the accumulated electric charges, and the amplification rate of the gain unit can be changed from the camera system control unit 10.

This corresponds to a case in which sensitivity changes when capturing an image. The electronic shutter and the gain unit are one of the exposure control unit.

The video signal processing unit 14 converts the image signal outputted from the image capturing element 12 into a video signal by performing signal processing such as white balance adjustment and gamma correction on the image signal and supplies the video signal to a recording control unit 16 and a display control unit 15.

The video signal processing unit 14 generates an evaluation value to be used in the processing of WB control, AE control, and AF control from an image and outputs the evaluation value.

The recording control unit 16 converts the video signal generated by the video signal processing unit 14 into data of a desired format and records the data in a recording medium 18 as moving image data or still image data.

The recording medium 18 is an information recording medium such a semiconductor memory or a magnetic recording medium such as a hard disk.

The recording control unit 16 performs control such as start and stop of recording an image according to an instruction of an operation unit not shown in the drawings.

When an instruction to start recording a moving image is issued from the operation unit, the recording control unit 16 converts the video signal outputted from the video signal processing unit 14 into moving image data of a predetermined format and records the moving image data in the recording medium 18.

When an instruction to stop recording a moving image is issued, the recording control unit 16 ends generation of moving image data.

When an instruction to photograph a still image is issued from the operation unit or an instruction to generate still image data is issued from the image capturing characteristic control unit 105, the recording control unit 16 generates still image data from a desired frame image in the video signal outputted from the video signal processing unit 14 and records the still image data in the recording medium 18.

As another method of generating still image data, metadata where a frame to be used to generate the still image data is described, from among a plurality of frame images that form moving image data, is recorded in a recording medium in association with the moving image data.

The still image data may be generated from the moving image data at timing different from the timing of photographing the moving image.

The display control unit 15 outputs a video signal processed according to usages such as a setting menu image and an image that has been recorded in addition to an image (a through image) based on the video signal outputted from the video signal processing unit 14. The display control unit 15, then, causes a display device 17 to display an image.

The display device 17 is, for example, a liquid crystal display element (LCD) and displays an image generated by the display control unit 15.

An angular velocity sensor 19 is a sensor to detect shake applied to the image capturing apparatus 1 and is used for the control of image blur correction performed by the image blur correction control unit 104.

Figure 2:
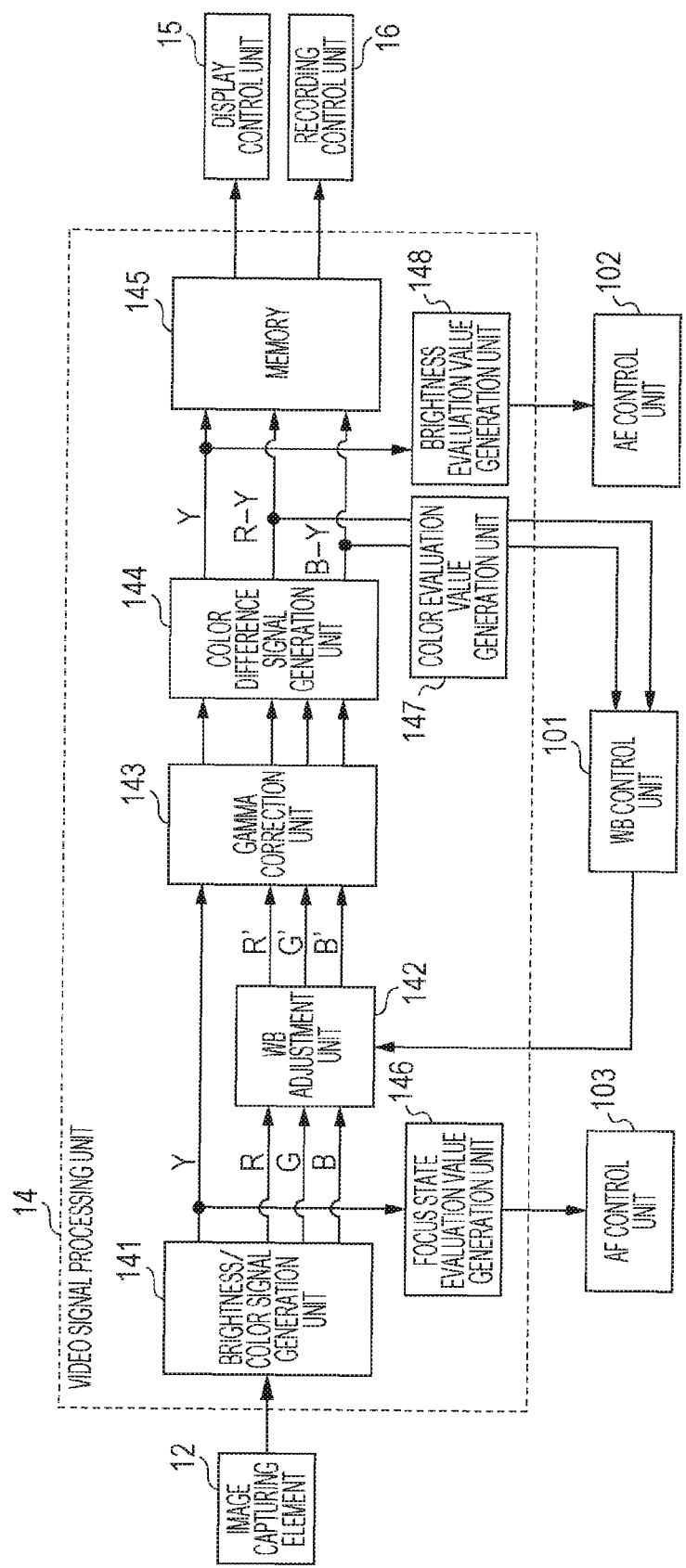
FIG. 2 is a block diagram showing a configuration example of a video signal processing unit 14.

FIG. 2 is a block diagram schematically showing a more detailed configuration of the video signal processing unit 14 in FIG. 1.

In FIG. 2, the image signal supplied from the image capturing element 12 is divided into a brightness signal (Y) and color signals (R, G, and B (red, green, and blue)) by a brightness/color signal generation unit 141.

A WB adjustment unit 142 adjusts the gain of each color of the color signals (R, G, and B) according to control from the WB control unit 101 and generates gain-adjusted color signals (R', G', and B').

A gamma correction unit 143 corrects the brightness signal (Y) and the color signals (R', G', and B') according to a predetermined gamma curve.

Further, a color difference signal generation unit 144 generates color difference signals (R-Y and B-Y) from the gamma-collected brightness signal and the gamma-collected color signals and stores the color difference signals (R-Y and B-Y) in a memory 145.

The memory 145 is an area to temporarily store the video signal to transfer the video signal to the recording control unit 16 and the display control unit 15.

The video signal that is temporarily stored in the memory 145 is read by the recording control unit 16 and the display control unit 15 and is used after being converted into a signal of a format according to each usage.

A color evaluation value generation unit 147 calculates a color evaluation value to be used in AWB control.

The color evaluation value generation unit divides an image signal corresponding to one screen (field or frame) into a predetermined number of (for example, 8×8) blocks, calculates an average value of the color difference signals (R-Y and B-Y) of pixels included in each block, and outputs an average color difference signal.

A brightness evaluation value generation unit 148 calculates a brightness evaluation value to be used in the AE control.

The brightness evaluation value generation unit divides an image signal of one screen (field or frame) into a predetermined number of (for example, 8×8) blocks and calculates and outputs an average value of the brightness signals (Y) of pixels included in each block.

A focus state evaluation value generation unit 146 calculates a focus evaluation value to be used in the AF control. The focus state evaluation value generation unit calculates a signal corresponding to a contour component amount on a high frequency side regarding a spatial frequency component of an image.

Specifically, the focus state evaluation value generation unit 146 extracts a high frequency component of a spatial frequency by setting a predetermined distance measurement area in an image signal corresponding to one screen and performing calculation processing such as HPF on the brightness signal (Y) in the area.

Further, the focus state evaluation value generation unit 146 calculates the focus evaluation value by performing calculation processing, such as cumulative addition, on the extracted high frequency component and outputs the focus evaluation value.

The focus evaluation value represents sharpness (contrast) of the video signal. However, the sharpness varies according to a focusing state of the image capturing lens. As a result, the focus evaluation value is a signal that represents the focusing state of the image capturing lens.

<WB Control>

Next, automatic white balance control (AWB control) performed by the WB control unit 101 will be described. The WB control unit 101 performs white balance control based on the color difference signals (R-Y and B-Y) generated by the color evaluation value generation unit 147.

The WB control unit 101 extracts a signal assumed to be a white subject (hereinafter referred to as a "near-white signal") from an image and adjusts the gains of R, G, and B in the WB adjustment unit 142 so that the ratio of color signals R, G, and B of the near-white signal is about 1:1:1.

As an example of an extraction method of the near-white signal, which is performed by the WB control unit 101, an average color evaluation value generated by the color evaluation value generation unit 147 is acquired.

The average color evaluation values of all blocks in the entire screen are further averaged to calculate the average color evaluation value of the entire screen. Then, a signal of the average color evaluation value of the entire screen is extracted as the near-white signal.

Alternatively, as another extraction method of the near-white signal, an area assumed to be a white subject is extracted from an image and a color evaluation value of the area may be defined as the near-white signal.

Figure 3:
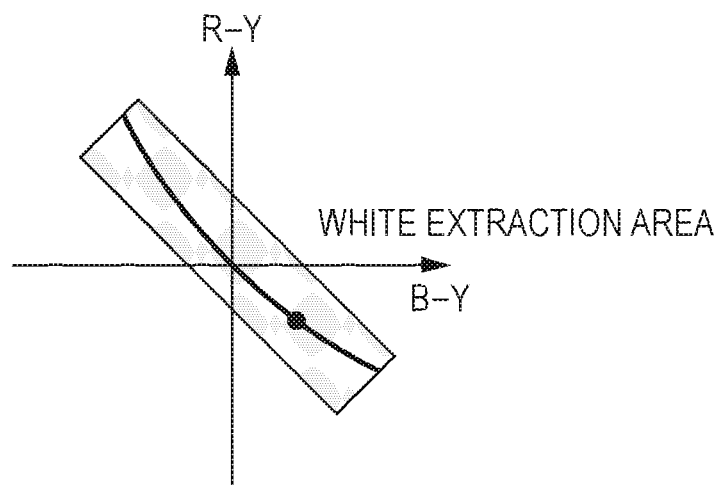
FIG. 3 is a graph for explaining an example of a control method with WB control.

Specifically, as shown in FIG. 3, a white extraction area which is a near-white area is set on a color difference plane where the vertical axis is R-Y and the horizontal axis is B-Y.

Average color evaluation values within the white extraction area are extracted from the average color evaluation values of each block generated by the color evaluation value generation unit 147, and the near-white signal is calculated by averaging the extracted average color evaluation values.

A white balance gain is calculated so that the near-white signal extracted in this way is close to a preset target white and the WB adjustment unit 142 is controlled based on the calculated white balance gain.

<AE Control>

Next, automatic exposure control processing performed by the AE control unit 102 will be described.

The AE control unit 102 performs photometry on a subject and controls diaphragm, shutter (electronic shutter), and gain so that the photographing is performed in a good exposure condition.

In the image capturing apparatus 1 according to the present disclosure, the photometry is performed based on the image signal obtained from the image capturing element 12. As an example of calculation method of a photometric value, first, the brightness evaluation value outputted from the brightness evaluation value generation unit 148 is acquired and a brightness value for each area is extracted.

Then, which photometric value of an area in the screen is emphasized is determined according to menu setting information that is arbitrarily set by a user or photographing scene information determined from a subject, and the extracted brightness value is weighted for each area.

Then, the brightness value of the entire image is calculated by performing processing such as calculating an average value of the entire area where the weighting is performed.

The brightness value obtained here is a brightness value that represents a result of photographing a light flux passing through the diaphragm 111 of the image capturing lens 11 by the image capturing element 12, so that the brightness value obtained here does not directly represent the brightness (Bv value) of the subject.

Regarding the photometric value used for exposure control, the By value is calculated from a brightness value obtained from an image, a current exposure value (Ev value), and a sensitivity of the image capturing element 12.

Then, the EV value that causes the brightness of the image to be target brightness is calculated based on the calculated photometric value. The AE control unit calculates a diaphragm value (Av value), a shutter speed (Tv value), and a gain (Sv value) by checking the Ev value against a program diagram.

Then, the AE control unit controls the diaphragm 111 and the image capturing element 12 (the electronic shutter and the gain) based on the calculated Av value, Tv value, and Sv value.

Although the photometric value described above is calculated by using the image signal obtained by the image capturing element 12, the brightness of the subject may be detected by a photoelectric conversion unit (a photometric unit) different from an image capturing element and the photometric value may be obtained from a detection signal of the brightness.

<AF Control>

Next, AF control processing performed by the AF control unit 103 will be described. The AF control unit 103 performs the AF control based on the focus evaluation value generated by the focus state evaluation value generation unit 146 in FIG. 2.

The focus state evaluation value generation unit 146 extracts a high frequency component of the spatial frequency in a predetermined distance measurement area of the image signal obtained by the image capturing element 12 and calculates a focus evaluation value indicating the contrast in the distance measurement area by integrating the extracted high frequency component.

The calculated focus evaluation value is supplied to the AF control unit 103 and is used for a focusing operation.

The AF control unit 103 samples the focus evaluation values while moving the focus lens in a direction in which the focus evaluation value increases, and performs control so as to detect a position of the focus lens at which the focus evaluation value is highest (that is, a focusing point).

Figure 4:
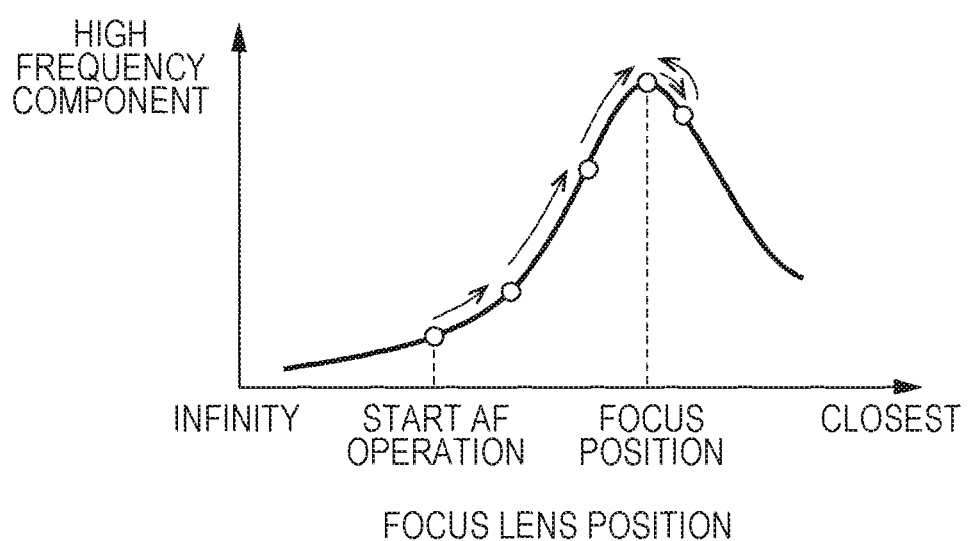
FIG. 4 is a graph for explaining an example of a control method with AF control.

In FIG. 4, when the AF control is started, first, the focus evaluation values are sampled while the focus lens is being moved in a certain direction.

When the focus evaluation value monotonously increases along with the movement of the focus lens, it is determined that the maximum of the focus evaluation value (that is, the focus position) is located in the same direction, so that the focus lens is continuously moved.

On the other hand, when the focus evaluation value decreases along with the movement of the focus lens, it is determined that the maximum of the focus evaluation value is located in the reverse direction, so that the focus lens is moved in the reverse direction.

When the focus evaluation values are sampled while the focus lens is being moved toward the closest side as shown in FIG. 4, the focus evaluation value monotonously increases along with the movement of the focus lens. Accordingly, it is determined that the maximum is located on the closest side and the focus lens is continuously moved toward the closest side.

In the case of FIG. 4, when the focus lens is continuously moved without a change, the focus evaluation value turns to decrease after passing through the peak. It is, thus, possible to confirm the maximum of the focus evaluation value (the focus position) at the peak.

When the maximum of the focus evaluation value is confirmed, the focus lens is returned to a position close to the maximum. In this way, it is possible to move the focus lens to the focus position at which the focus evaluation value is the maximum. This operation is referred to as a hill-climbing drive mode.

Further, the focus evaluation values are sampled while the focus lens is minutely moved back and forth around the focusing point, so that it is confirmed that the current position of the focus lens is at the peak of the focus evaluation value. This operation is referred to as a minute drive mode.

When it is determined that the focus lens is not located at the position at which the focus evaluation value is at the peak, the focus lens is controlled to be maintained at a position close to the focusing point by moving the focus lens in a direction in which the evaluation value increases.

<Image Blur Correction Control>

Next, image blur correction control performed by the image blur correction control unit 104 will be described with reference to FIG. 5.

Figure 5:
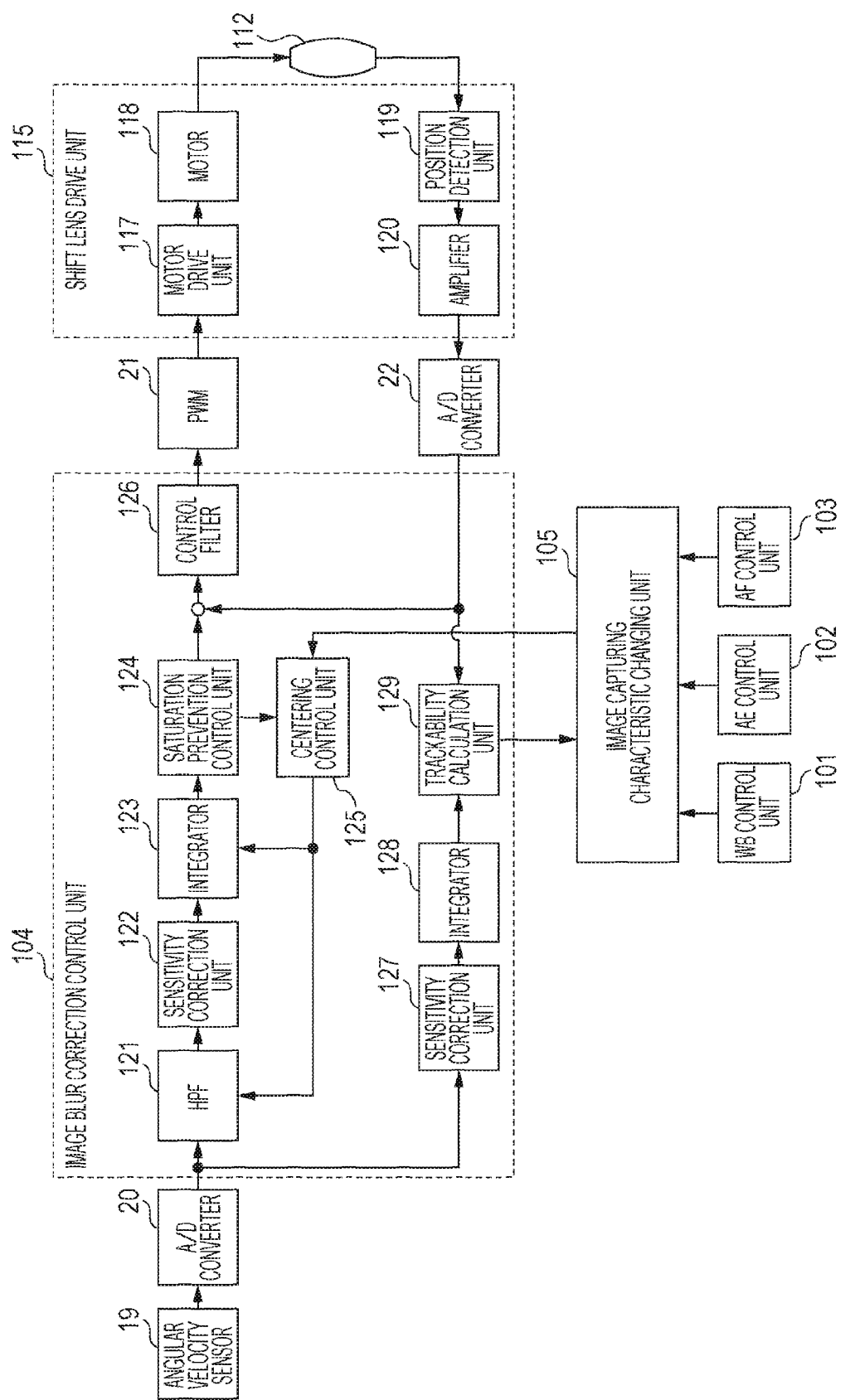
FIG. 5 is a block diagram showing a configuration example of an image blur correction control unit 104.

FIG. 5 is a block diagram for explaining in further detail the image blur correction control unit 104 and the shift lens drive unit 115 in FIG. 1.

The image blur correction control unit 104 detects shake applied to the image capturing apparatus 1 based on angular velocity information outputted from the angular velocity sensor 19.

Then, the image blur correction control unit 104 corrects the image blur occurring in the captured image by driving the shift lens 112 so as to cancel the shake based on shake correction data.

In the angular velocity sensor 19, two angular velocity sensors are arranged in two axis directions which are a rotation axis (Yaw) in the horizontal direction and a rotation axis (Pitch) in the vertical direction.

As signal processing and drive control of the shift lens 112 in each axis can be realized in the same processing for both axes, the signal processing and the drive control will be hereinafter described for only one axis.

The angular velocity sensor 19 detects the angular velocity of the shake applied to the image capturing apparatus 1 and outputs a voltage according to the angular velocity.

An A/D (analog to digital) converter 20 converts the voltage outputted from the angular velocity sensor 19 into digital data and receives the digital data as angular velocity data.

An HPF (high pass filter) 121 removes a low frequency component of the angular velocity data and supplies the angular velocity data to a sensitivity correction unit 122.

The sensitivity correction unit 122 drives the shift lens 112 by the amount of displacement suitable (or preferably optimal) for the image blur correction.

Therefore, the sensitivity correction unit 122 converts the amplitude of the angular velocity data by multiplying the angular velocity data by eccentricity sensitivity of the shift lens 112 (that is, a coefficient obtained from a ratio of the amount of displacement of an image forming position on an image surface to the amount of displacement of the shift lens).

Then, as a unit of an output from the sensitivity correction unit 122 is the angular velocity, the angular velocity is converted into an angular displacement by performing first-order integration on the angular velocity using an integrator 123.

The integration operation performed here is imperfect integration in order to prevent saturation, and the integration operation is performed by a generally known primary LPF (low pass filter).

The angular displacement data calculated by the integrator 123 is limited and outputted by a saturation prevention control unit 124 so that the shift lens 112 does not bump into an end of a mechanical movable range.

Specifically, a limiter of control range is provided within the mechanical movable range of the shift lens 112 and the angular displacement data is limited so that the angular displacement data does not exceed the limiter.

A centering control unit 125 determines whether or not an intended operation such as panning and tilting is performed, and performs control so as to return the position of the shift lens to the center.

Specifically, a predetermined threshold value is provided further inside the limiter provided in the saturation prevention control unit 124, and it is determined that the panning is performed when the angular displacement data exceeds the threshold value.

A determination result is notified to the centering control unit 125, and a cutoff frequency of the HPF 121 is heightened and the angular velocity data inputted into the integrator 123 is limited when it is determined that the panning is performed.

By subtracting a predetermined offset from the angular velocity data inputted into the integrator 123 or increasing a cutoff frequency of LPF calculation performed in the integrator 123, output of the integrator 123 is controlled so that it returns to the center.

In this way, even when an intended shake such as the panning and the tilting is performed, the shift lens 112 is controlled so that it is within the movable range of the shift lens 112, and a drive target position which is the final amount of displacement of the shift lens 112 is calculated.

The shift lens drive unit 115 includes a position detection unit 119, an amplifier 120, a motor drive unit 117, and a motor 118.

The position detection unit 119 detects the position of the shift lens 112 and outputs a voltage according to the position. The voltage is amplified by the amplifier 120 into a signal within an appropriate voltage range.

Then the signal is converted into digital data by the A/D converter 20 and is received as position data.

Deviation data which is a difference between the drive target position and the position data is inputted into a control filter 126, various signal processing operations such as amplification and phase compensation are performed on the deviation data, and the processed deviation data is outputted to a pulse width modulation unit 21.

The pulse width modulation unit 21 modulates the output of the control filter 126 into a waveform (that is, a PWM waveform) that changes a duty ratio of a pulse wave and supplies the PWM waveform to the motor drive unit 117.

The motor 118 is, for example, a voice coil type motor. When the motor 118 is driven by the motor drive unit 117, the shift lens 112 moves in a direction perpendicular to the optical axis.

A feedback loop is formed in which the position of the moved shift lens 112 is detected by the position detection unit 119 and the next deviation data is calculated, and it is controlled so that the difference between the drive target position and the position data is small or below a certain threshold value.

It is possible to correct the image blur by driving the shift lens 112 according to the shake data detected by the angular velocity sensor 19 as described above.

<Method for Generating WB Appropriateness>

Next, details of method for calculating WB appropriateness will be described with reference to FIGS. 6A and 6B.

Figure 6A:
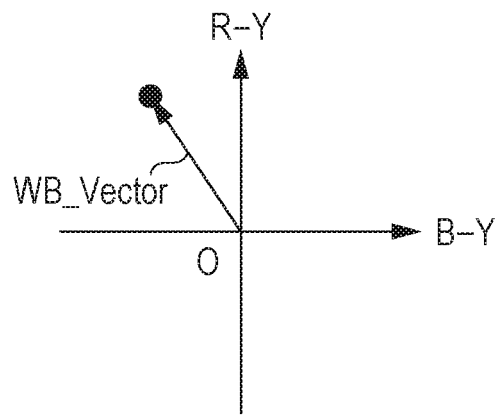
FIGS. 6A and 6B are graphs for explaining an example of a calculation method for calculating a degree of appropriateness of the WB control.

In a graph of FIG. 6A, color differences of R-Y and B-Y are used as coordinates.

When the coordinates of the color evaluation value outputted from the color evaluation value generation unit 147 described above are located near the origin O in FIG. 6A, it is indicated that RGB are balanced, that is, white balance is good.

On the other hand, it is indicated that, the farther the coordinates is from the origin O, the worse the white balance is. A vector on the coordinates of FIG. 6A of the color evaluation value is defined as WB_Vector.

Figure 6B:
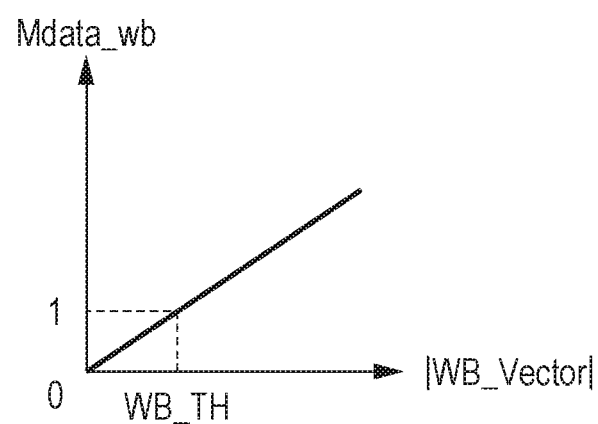

FIG. 6B shows an example of a graph in which the horizontal axis indicates the size of WB_Vector and the vertical axis indicates appropriateness Mdata_wb to be generated.

As described above, the larger the value on the horizontal axis, the worse the white balance of the image. In FIG. 6B, Mdata_wb is calculated by the following calculation formula.

$$M\text{data\_}wb=|WB\_\text{Vector}|/WB\_TH$$

That is to say, the deviation of white balance from the optimal value is normalized by a predetermined threshold value WB_TH. Here, WB_TH is set as a permissible deviation value in white balance.

A permissible deviation value in color varies with each individual and is difficult to determine uniquely, so that the permissible value may be arbitrarily set by a user.

Further, depending on a light source, light might not converge to the origin. In this case, the threshold value of WB_TH may be increased or the origin of FIG. 6A may be shifted according to the light source.

Based on this calculation, the closer the Mdata_wb is to 0, the better the white balance is; and the greater the Mdata_wb is than 1, the worse the white balance is.

<Method for Generating AE Appropriateness>

Figure 7A:
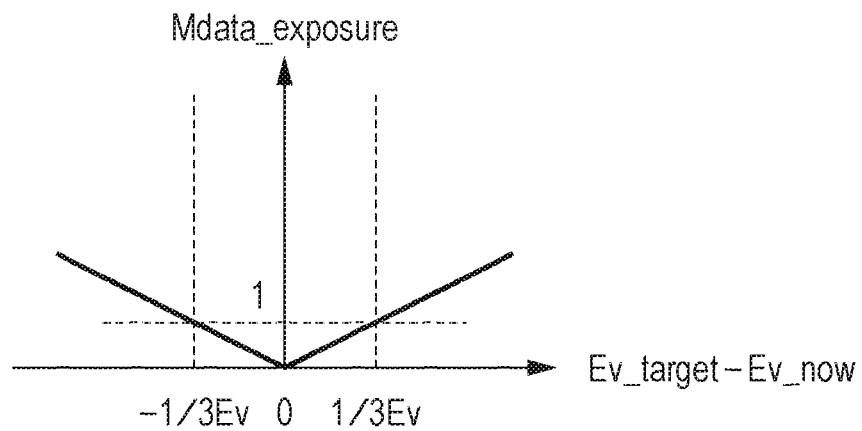
FIGS. 7A and 7B are graphs for explaining an example of a calculation method for calculating appropriateness of AE control.
Figure 7B:
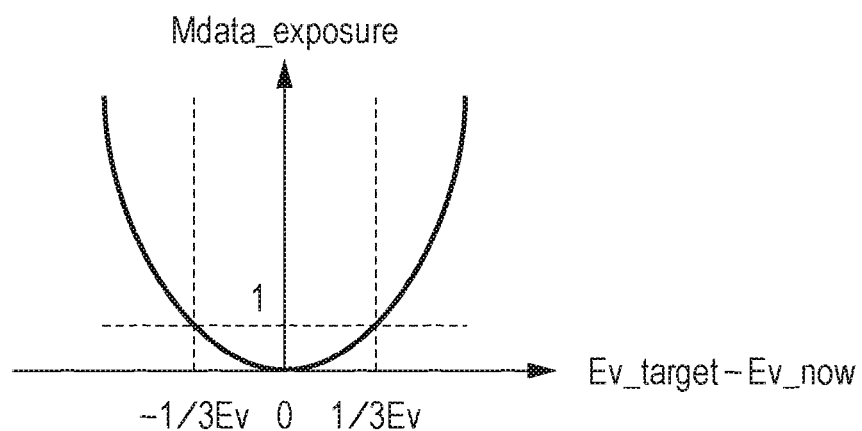

Next, details of method for generating AE appropriateness will be described with reference to FIGS. 7A and 7B. The horizontal axis of graphs of FIGS. 7A and 7B is represented by a unit system using APEX (Additive System of Photographic Exposure). The definition of each code is as follows:

Ev_now . . . Current exposure value

Ev_target . . . Appropriate exposure value determined by the AE control unit 102

FIG. 7B shows an example of a graph in which the horizontal axis indicates Ev_target−Ev_now, that is, a difference between the appropriate exposure value and the current exposure value, and the vertical axis indicates appropriateness Mdata_exposure to be generated.

On the horizontal axis, when a value increases in the plus direction, it indicates a state in which over exposure occurs;

when a value decreases in the minus direction, it indicates a state in which under exposure occurs, and when a value is 0, it indicates a state in which the exposure is correct.

In this state, Mdata_exposure=0 is established. In FIG. 7A, Mdata_exposure is calculated by the following calculation formula.

$$M\text{data\_exposure} = |Ev\_target - Ev\_now|/(⅓)$$

That is to say, the deviation of the current exposure from the appropriate exposure is normalized by a predetermined Ev value (here, ⅓Ev). Here, normalization by ⅓Ev is only an example.

The value may be arbitrarily set by a user or may be a variable depending on brightness distribution of a subject.

For example, if overexposure or black defect occurs when the exposure deviates by ⅕Ev, it is possible to employ a method in which the deviation is normalized by ⅕Ev.

Based on this calculation, the closer the Mdata_exposure is to 0, the more appropriate the exposure is; and the greater the Mdata_exposure is than 1, the more under or the more over the exposure is.

FIG. 7B has the same horizontal and vertical axes as those of FIG. 7A and is a graph showing another example of the method for calculating Mdata_exposure. In FIG. 7B, Mdata_exposure is calculated by the following calculation formula.

$$M\text{data\_exposure} = (2^{(|Ev\_target - Ev\_now|)} - 1)/(2^{(⅓)} - 1)$$

The Ev value is a unit system in which the amount of light entering the image capturing element is represented by the base 2 logarithm. For example, when the Ev value changes by 1, the amount of light becomes two times or ½ times.

In the above formula, the normalization is performed after the unit system of APEX system is converted into a unit system of the actual amount of light, so that it is possible to more accurately represent the deviation of exposure by Mdata_exposure.

<Method for Generating AF Appropriateness>

Details of method for generating AF appropriateness will be described with reference to FIGS. 8A and 8B. For explanation, codes are defined as follows:

Dl . . . Focus evaluation value (n value) held when focusing
Dt . . . Current focus evaluation value
Df . . . Depth of field (infinity side)
Dn . . . Depth of field (closest side)

Figure 8A:
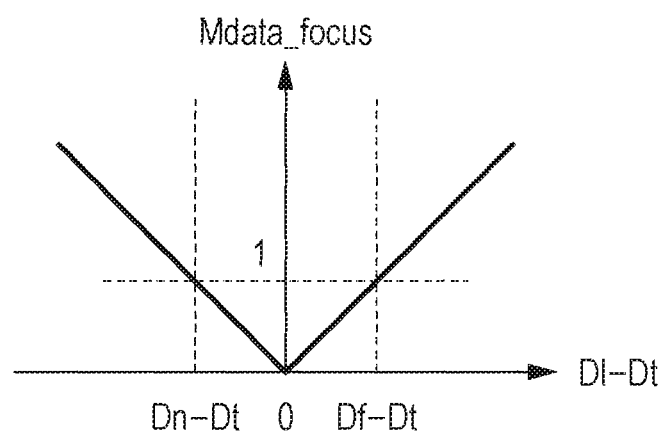
FIGS. 8A and 8B are graphs for explaining an example of a calculation method for calculating appropriateness of the AF control.
Figure 8B:
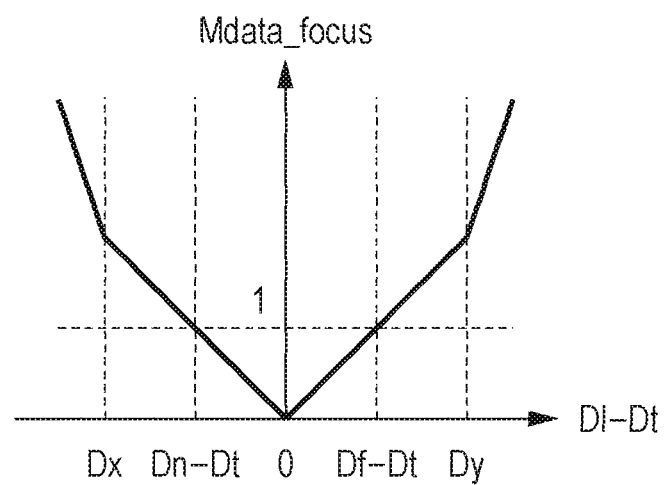

FIG. 8A shows an example of a graph in which the horizontal axis indicates Dl−Dt, that is, a difference between the focus evaluation value held when focusing and the current focus evaluation value, and the vertical axis indicates appropriateness Mdata_focus to be generated.

When Dl−Dt is 0, it indicates a perfectly focused state, and in this state, Mdata_focus=0 is established. In FIG. 8A, Mdata_focus is calculated by the following calculation formula.

$$M\text{data\_focus} = |(Dl-Dt)/(Df-Dt)|$$

Here, $Dl-Dt \geq 0$ $$M\text{data\_focus} = |(Dl-Dt)/(Dn-Dt)|$$

Here, $Dl-Dt < 0$

In other words, the deviation from a target value of a photographing subject distance is normalized by the depth of field. Thereby, the closer the Mdata_focus is to 0, the more in focus; and the greater the Mdata_focus is than 1, the more out of focus.

<Method for Generating Image Blur Correction Appropriateness>

A sensitivity correction unit 127, an integrator 128, and a trackability calculation unit 129 in FIG. 5 are blocks for calculating trackability for image blur correction control (that is, appropriateness of image blur correction control).

In the same manner as the sensitivity correction unit 122, the sensitivity correction unit 127 converts the amplitude of the angular velocity data by multiplying the angular velocity data by the eccentricity sensitivity of the shift lens 112 into an appropriate (or preferably optimal) amplitude to perform the image blur correction using the shift lens.

The integrator 128 converts the angular velocity into an angular displacement by performing first-order integration on the angular velocity. However, different from the integrator 123, the angular displacement is calculated by a complete integral instead of an incomplete integral realized by LPF.

The output of the integrator 128 is calculated without filtering the angular velocity data with HPF or LPF, so that it is possible to accurately obtain the shake applied to the image capturing apparatus as compared with the output of the integrator 123.

The trackability calculation unit 129 calculates image blur correction appropriateness Mdata_shake by using the following calculation formula.

Shake_det . . . Output of the integrator 128 (the amount of detected angular displacement)
Shake_cor . . . Output of an A/D converter 22 (the amount of corrected angular displacement)
f . . . Current focal distance $$M\text{data\_shake} = |Shake\_det - Shake\_cor|/f$$

That is to say, the amount of image blur, which is shake correction data remaining in the image data, is obtained by calculating a difference between an angular displacement amount calculated from shake information detected by the angular velocity sensor and an angular displacement amount that is actually corrected by the shift lens 112. The amount of image blur is further normalized by the focal distance f.

<Operation of Image Capturing Characteristic Control Unit>

Next, an operation of the image capturing characteristic control unit 105 in FIGS. 1 and 5 will be described. The image capturing characteristic control unit 105 is the most characteristic part of the present disclosure.

A purpose of the image capturing characteristic control unit 105 is to easily obtain a high quality still image by increasing the probability that the photographing conditions of all imaging parameters are in a suitable state.

Here, as an example of processing performed by the image capturing characteristic control unit 105, the appropriateness of AE, AF, and WB is referred to, and control is performed so that the control characteristics of image blur correction are changed according to the appropriateness.

Here, a method for changing the control characteristics of the image blur correction control unit 104 will be described.

It is possible to change the characteristics of the image blur correction control unit 104 by operating the cutoff frequency of the HPF 121 or the cutoff frequency of the LPF calculated by the integrator 123.

When the cutoff frequency of the HPF or the LPF is heightened, low frequency components are removed from the detected blur information, so that the effect of image blur correction decreases.

Further, the phase close to the cutoff frequency changes in an advancing direction and, therefore, trackability of the image blur correction to the detected shake decreases (the effect of image blur correction decreases).

On the other hand, when the cutoff frequency is lowered, blur of low frequency can be also corrected and the phase advance is reduced when paying attention to phase characteristics. Therefore the trackability of the image blur correction to the detected blur increases (the effect of image blur correction increases).

The image capturing characteristic control unit 105 can change these cutoff frequencies and control the characteristics of image blur correction by controlling the centering control unit 125.

By the way, although it is possible to obtain a high quality video image with less image blur by increasing the trackability of the image blur correction (intensifying the effect of the image blur correction), it is not possible to maintain high trackability at all times while photographing a moving image.

This is because there is a mechanical (or optical) movable end in the movable range of the shift lens; and, therefore, when the image blur correction is performed so as to follow a detected blur, the position of the shift lens gradually approaches the movable end and finally the shift lens bumps into the movable end.

When the shift lens bumps into the movable end, the blur correction cannot be performed any more, and an image blur of the captured image appears.

Therefore, the position of the shift lens 112, which is an image blur correction unit, is controlled to move close to the center of the movable range as much as possible. Thus, it is possible to secure a large margin in an image blur correction range and perform correction of a large blur to be generated.

The image capturing characteristic control unit 105, which is an evaluation unit, evaluates the validity of an imaging parameter acquired from image data outputted from the image capturing element that captures a subject image and generates an evaluation value of the imaging parameter.

The imaging parameter is any one of an exposure parameter used for exposure control, a focus state parameter used for focus lens control, and a white balance parameter.

The image blur correction control unit 104, which is a changing unit, sets an image blur correction performance of when the evaluation value of the imaging parameter is close to a target value to be greater than an image blur correction performance of when the evaluation value of the imaging parameter is far from the target value when a moving image is photographed.

Specifically, the image capturing apparatus according to the present disclosure refers to the appropriateness of the AE control, the AF control, and the WB control.

When each appropriateness is low, the image blur correction control unit 104 controls to secure a margin by positioning the shift lens 112 close to the center by lowering the trackability of the image blur correction so that the correction can be performed on a large blur.

When the appropriateness of the AE control, the AF control, and the WB control is high, it is controlled so as to increase the trackability of the image blur correction and reduce the image blur as much as possible. By performing control as described above, it is possible to obtain a high quality still image while photographing a moving image.

Hereinafter, the processing performed by the image capturing characteristic control unit 105 will be described in detail with reference to a flowchart of FIG. 9.

The processing shown in FIG. 9 is repeatedly performed at a predetermined cycle such as, for example, 60 Hz that is a cycle of capturing a flame of an image of the image capturing apparatus. In step S101, the AF appropriateness generated by the AF control unit 103 is acquired, and it is determined whether or not the AF appropriateness is greater than or equal to a predetermined threshold value.

When it is determined that the AF appropriateness is greater than or equal to the predetermined threshold value, the process proceeds to step S105, and when it is determined that the AF appropriateness is smaller than the predetermined threshold value, the process proceeds to step S102. In step S102, the AE appropriateness generated by the AE control unit 102 is acquired, and it is determined whether or not the AE appropriateness is greater than or equal to a predetermined threshold value.

When it is determined that the AE appropriateness is greater than or equal to the predetermined threshold value, the process proceeds to step S105, and when it is determined that the AE appropriateness is smaller than the predetermined threshold value, the process proceeds to step S103. In step S103, the WB appropriateness generated by the WB control unit 101 is acquired, and it is determined whether or not the WB appropriateness is greater than or equal to a predetermined threshold value.

When it is determined that the WB appropriateness is greater than or equal to the predetermined threshold value, the process proceeds to step S105, and when it is determined that the WB appropriateness is smaller than the predetermined threshold value, the process proceeds to step S104.

Step S105 is a processing performed when it is determined that a determination result is greater than or equal to a predetermined value in one of the determinations of steps S101 to S103. In step S105, the characteristics of image blur correction performed by the image blur correction control unit 104 are changed so as to decrease a correction effect.

In step S104, the characteristics of image blur correction performed by the image blur correction control unit 104 are changed so as to increase the correction effect, and then the process proceeds to step S106.

As a specific method of the processing performed in step S104 and step S105, the cutoff frequency of the HPF 121 is lowered and the cutoff frequency of the LPF used for the calculation of the integrator 123 is set to be low.

Figure 10:
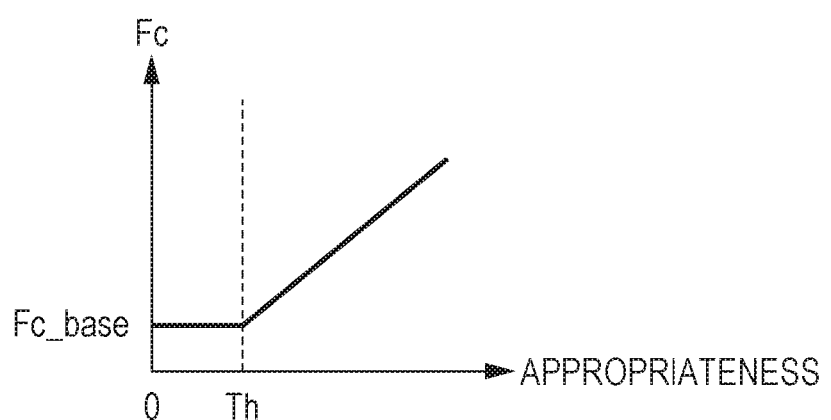
FIG. 10 is a graph for explaining an example of calculating a cutoff frequency of the image blur correction control unit 104 from a degree of appropriateness.

FIG. 10 is a diagram for explaining a method for calculating the cutoff frequencies of the HPF and the LPF according to each appropriateness.

In FIG. 10, the horizontal axis indicates each appropriateness and the vertical axis indicates the cutoff frequencies of the HPF and the LPF.

In step S105, the appropriateness of the AE control, the AF control, and the WB control is referred to, and the cutoff frequency is calculated for each appropriateness.

Then, the highest cutoff frequency of the calculated cutoff frequencies is set to the HPF 121 and the LPF used for the calculation of the integrator 123.

In step S106, trackability of image blur correction generated by the image blur correction control unit 104 is acquired, and it is determined whether or not the trackability of image blur correction is greater than or equal to a predetermined threshold value.

When it is determined that the trackability of image blur correction is greater than or equal to the predetermined threshold value, the process proceeds to step S107. When it is determined that the trackability of image blur correction is smaller than the predetermined threshold value, the process is completed.

Step S107 is a processing performed when it is determined that all the imaging parameters are close to an appropriate value, and an instruction to generate still image data from a current frame of a moving data is notified to the recording control unit 16 in FIG. 1.

The recording control unit 16, which functions as a recording unit, records a frame image whose image blur correction performance is large or exceeds a predetermined threshold value as still image reproduction data.

When an instruction to generate still image data is issued from the image capturing characteristic control unit 105 to the recording control unit 16, the recording control unit 16 generates still image data from a desired frame image in the video signal outputted from the video signal processing unit 14 and records the still image data in the recording medium 18.

As another method for generating still image data, metadata where a frame to be used to generate the still image data is described from among a plurality of frame images that form moving image data is recorded in a recording medium in association with the moving image data.

The still image data may be generated from the moving image data at a timing different from the timing of photographing the moving image.

As described above, in the present disclosure, each imaging parameter is controlled based on four types of appropriateness, which are the AF appropriateness, the AE appropriateness, the WB appropriateness, and the image blur correction appropriateness.

Therefore, it is possible to control all the photographing conditions to be in a suitable condition as much as possible.

It is possible to generate a good still image with higher probability when generating a still image from a moving image.

It is possible to provide an image capturing apparatus that can easily generate an optimal image as a still image when generating the still image from a photographed moving image.

While the present disclosure has been described based on a preferred embodiment, the present disclosure is not limited to the specific embodiment.

The present invention includes various forms without departing from the scope of the disclosure. For example, it is not necessary to generate all of the four types of appropriateness, but a system using at least two types of appropriateness may be used.

(Second Embodiment)

Next, a second embodiment of the present disclosure will be described. The present embodiment can be realized by the same configuration as that of the image capturing apparatus 1 described with reference to FIG. 1 and, therefore, the description of the configuration will not be repeated.

In the present embodiment, method for control performed by an image capturing characteristic changing unit 105 will be described.

Here, as an example of processing performed by the image capturing characteristic changing unit 105, a method will be described in which the appropriateness of AF is referred to and the control characteristics of image blur correction are changed according to a temporal change of the appropriateness.

When a state changes from an out-of-focus state to an in-focus state, in other words, when a focusing operation is performed by AF, the image capturing characteristic changing unit 105 of the present embodiment sets the correction effect of image blur correction to be low. Then, in the in-focus state, the image capturing characteristic changing unit 105 increases the correction effect of image blur correction.

In the same manner as in the first embodiment, the purpose of the above is to easily obtain a high quality still image by increasing the probability that the photographing conditions of all imaging parameters are in a suitable state. The purpose is more easily achieved by monitoring temporal change of the appropriateness.

Specifically, it is possible to derive maximum effect of the image blur correction in the in-focus state by controlling the shift lens 112 to be located close to the center of control range at a time point when an AF operation is completed.

While a method in which control is performed by referring to only the appropriateness of AF will be described in order to clarify the meaning of the disclosure, it is possible to apply the same method even when a plurality of degrees of appropriateness such as AE and AWB are referred to.

Hereinafter, the processing performed by the image capturing characteristic changing unit 105 will be described in detail with reference to a flowchart of FIG. 11.

Figure 11:
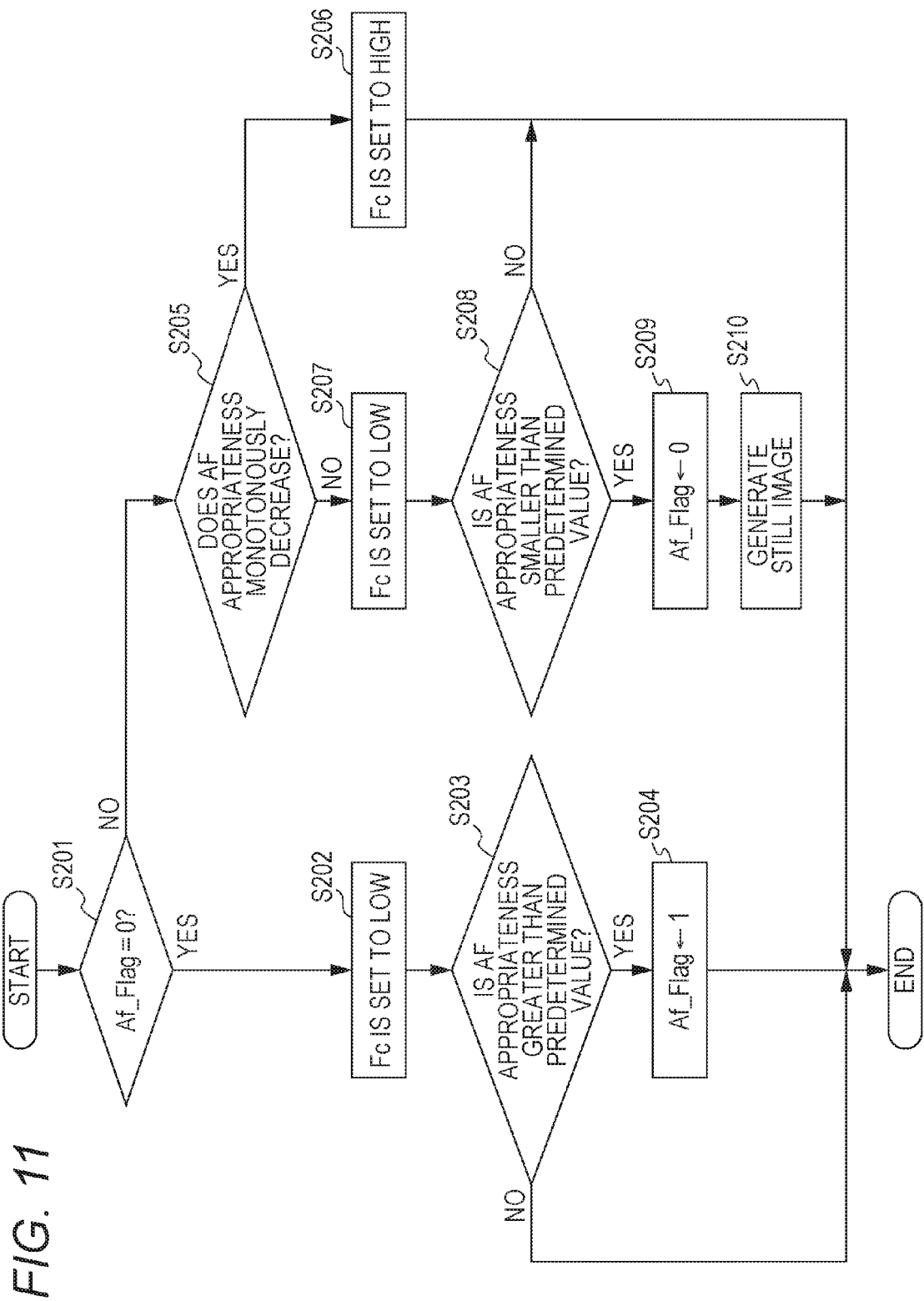
FIG. 11 is a flowchart according to a second embodiment of the present disclosure.

The processing shown in FIG. 11 is repeatedly performed at a predetermined cycle such as, for example, 60 Hz that is a cycle of capturing a flame of an image of the image capturing apparatus.

In step S201, Af_Flag that is a variable of an internal memory is referred to, and it is determined whether or not the Af_Flag is 0. When the Af_Flag is 0, the process proceeds to step S202, and when the Af_Flag is not 0, the process proceeds to step S205. The Af_Flag is a flag for showing a state of processing of the image capturing characteristic changing unit 105. The Af_Flag is set to 1 when it is determined that the image is out of focus.

In step S202, the cutoff frequency is set to low so as to increase the effect of the image blur correction by changing the characteristics of the image blur correction performed by the image blur correction control unit 104. The cutoff frequency at this time is set to Fc_base that is a normal cutoff frequency.

In step S203, the AF appropriateness generated by the AF control unit 103 is acquired, and it is determined whether or not the AF appropriateness is greater than a predetermined threshold value. If it is determined that the AF appropriateness is greater than the predetermined threshold value (out of focus), the process proceeds to step S204 and the Af_flag is set to 1. When it is determined that the AF appropriateness is smaller than or equal to the predetermined threshold value, the process is completed.

Step S205 is processing performed when it is determined that the Af_flag is not 0 in step S201, that is, processing performed once the image is out of focus.

In step S205, the AF appropriateness generated by the AF control unit 103 is acquired, and it is determined whether or not the AF appropriateness monotonously decreases.

In this determination, degrees of AF appropriateness that are acquired in the past are held in a memory, and it is determined whether or not the degree of AF appropriateness continuously decreases during a predetermined number of times. When it is determined that the AF appropriateness monotonously decreases in step S205, the process proceeds to step S206, and when it is determined that the AF appropriateness does not monotonously decrease, the process proceeds to step S207.

In step S206, the cutoff frequency is set to high so as to decrease the effect of the image blur correction by changing the characteristics of the image blur correction performed by the image blur correction control unit 104, and the process is completed.

In step S207, the characteristics of the image blur correction are set to Fc_base that is a normal cutoff frequency.

In step S208, it is determined whether or not the AE appropriateness is smaller than or equal to a predetermined threshold value, and when it is determined that the AF appropriateness is smaller than or equal to the predetermined threshold value, the process proceeds to step S209. When it is determined that the AF appropriateness is greater than the predetermined threshold value, the process is completed.

In step S209, the Af_flag is cleared to 0, and the process proceeds to step S210. In step S210, an instruction to generate still image data from a current frame of a moving data is notified to the recording control unit 16 in FIG. 1.

A case will be described in which the recording control unit 16 receives the instruction to generate still image data from the image capturing characteristic changing unit 105.

In this case, the recording control unit 16 generates still image data from a desired frame image in the video signal outputted from the video signal processing unit 14 and records the still image data in the recording medium 18.

As another method for generating still image data, meta data where a frame to be used to generate the still image data is described from among a plurality of frame images that form moving image data is recorded in a recording medium in association with the moving image data.

The still image data may be generated from the moving image data at timing different from the timing of photographing the moving image.

Figure 12A:
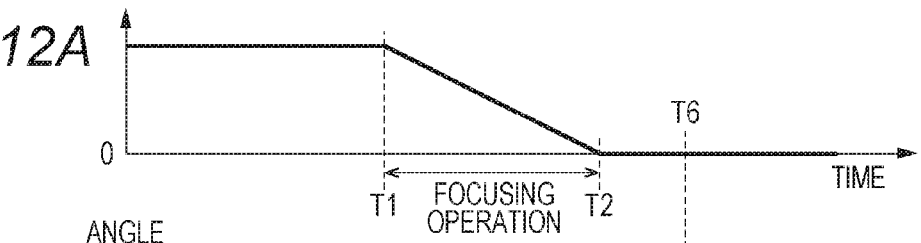
FIGS. 12A to 12F are diagrams showing temporal changes in AF appropriateness and an image blur correction according to the second embodiment.

Next, FIGS. 12A to 12F are diagrams for explaining temporal changes of the AF appropriateness and the image blur correction by control performed by the image capturing characteristic changing unit 105. FIG. 12A is a graph showing the temporal change of the AF appropriateness when the horizontal axis represents time and the vertical axis represents the AF appropriateness.

FIGS. 12A to 12F are graphs showing a state change in which the AF operation is started from a state of out-of-focus (that is, the AF appropriateness is large or exceeds a predetermined threshold value) and the state is changed to in-focus (that is, the AF appropriateness is small or is below a predetermined threshold value). Here, time T1 indicates a time when the AF operation is started from the state of out-of-focus and the drive of the focus lens is started, and time T2 indicates a time when a subject is focused and the AF operation is stopped.

Therefore, as shown in FIG. 12A, the AF appropriateness decreases from the time T1 to the time T2.

Figure 12B:
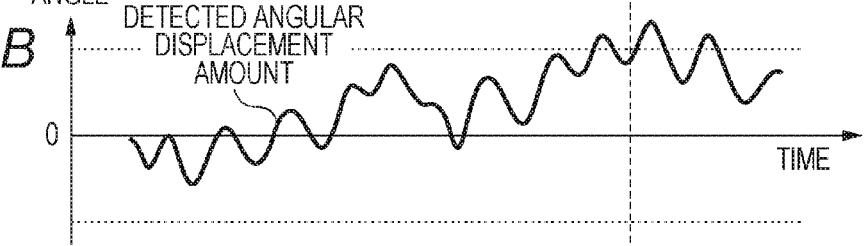

FIG. 12B shows an angular displacement amount applied to the image capturing apparatus 1. In the present embodiment, the angular displacement amount is information obtained from an output of the angular velocity sensor 19.

Figure 12C:
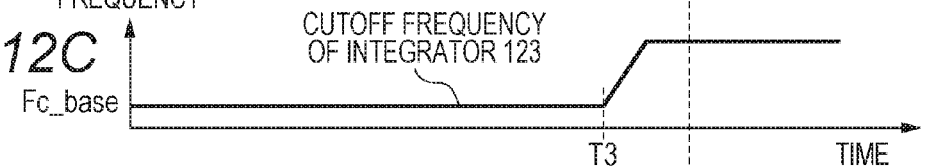
Figure 12D:
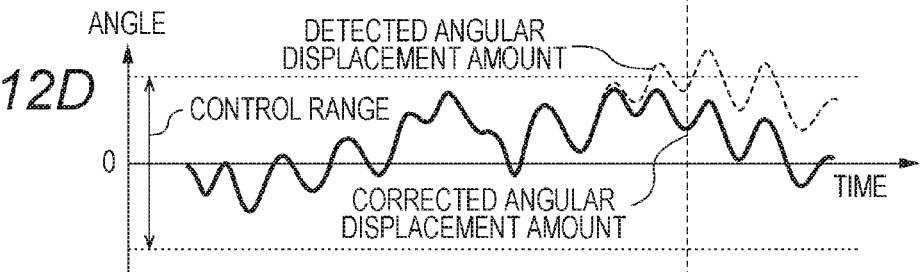
Figure 12E:
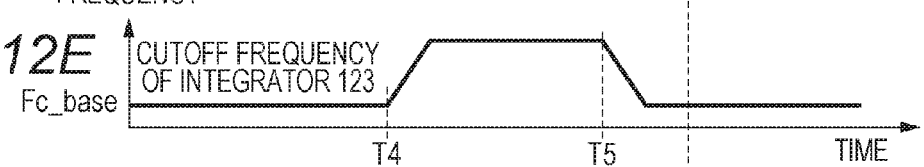
Figure 12F:
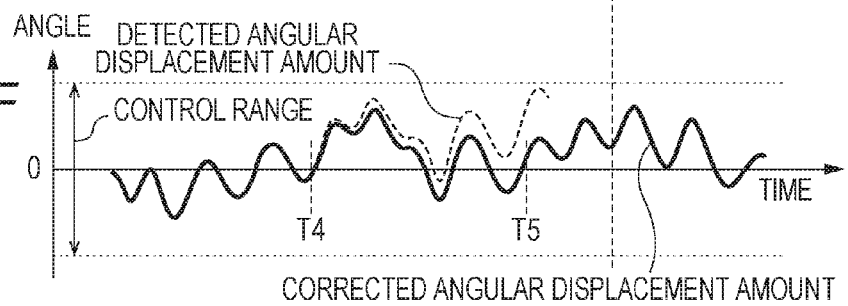

FIGS. 12C and 12D are graphs for explaining conventional control of image blur correction. FIGS. 12E and 12F are graphs for explaining control of the image blur correction in the image capturing apparatus of the present embodiment.

FIGS. 12C and 12E show a change of the cutoff frequency of LPF used for the calculation of the integrator 123 and the vertical axis indicates the cutoff frequency. The cutoff frequency relates to the correction effect of image blur correction. The lower the cutoff frequency, the higher the effect of image blur correction, and the higher the cutoff frequency, the lower the effect of image blur correction.

FIGS. 12D and 12F show an angular displacement amount of shake having been actually corrected, which is indicated by a solid line, with respect to a detected angular displacement amount of shake (dashed line). A limiter of control range is provided within the movable range of the shift lens 112 (processing performed by the saturation prevention control unit 124).

First, the conventional control of image blur correction will be described with reference to FIGS. 12C and 12D.

In the conventional control of image blur correction, the cutoff frequency of LPF used for calculation of the integrator 123 is operated so that the shift lens 112 does not bump into an end of a mechanical movable range.

Specifically, when the output of the integrator 123 becomes close to the limiter, the cutoff frequency is controlled to be increased so that the output returns to the center (processing performed by the centering control unit 125).

In FIGS. 12C and 12D, during the period before the time T3, the cutoff frequency is set to Fc_base that is a normal cutoff frequency, and the correction effect is high.

Therefore, there is little difference between the detected angular displacement amount and the corrected angular displacement amount. Around the time T3, when a correction amount of the image blur correction (the output of the integrator 123) becomes close to an end of the control range, the cutoff frequency is controlled to be gradually increased and the correction amount is returned to the center.

By performing the control in this way, the shift lens 112 is caused not to bump into an end of the mechanical movable range.

In other words, when an AF evaluation value is close to a target value of the imaging parameter, the image blur correction control unit 104, which is a changing unit, once decreases the image blur correction performance and thereafter increases the image blur correction performance to be greater than the image blur correction performance before being decreased once.

However, the conventional image blur correction is controlled independently from the AF control and they are not related to each other.

Therefore, as obvious from FIGS. 12A and 12C, a state rarely occurs in which the AF appropriateness is high (the appropriateness is close to 0) and the effect of image blur correction is high (the cutoff frequency is low).

Next, the image blur correction in the present embodiment (the processing performed by the image capturing characteristic changing unit 105) will be described with reference to FIGS. 12E and 12F. The image capturing characteristic changing unit 105 in the present embodiment refers to the AF appropriateness and operates the cutoff frequency of the integrator 123 according to the temporal change of the AF appropriateness.

In FIG. 12A, until the time T1, a state of out-of-focus is shown and the AF appropriateness is large or exceeds a predetermined threshold value.

In this period of time, as shown in the period of time until the time T4 in FIG. 12E, the cutoff frequency of the integrator 123 is set to Fc_base that is the normal cutoff frequency. Next, the period of time from time T1 to time T2 in FIG. 12A is a period of time in which the AF appropriateness monotonously decreases.

This is because the AF operation starts at the time T1 and a state changes to the in-focus state at the time T2. When the image capturing characteristic changing unit 105 determines that the AF appropriateness monotonously decreases, the image capturing characteristic changing unit 105 sets the cutoff frequency of the integrator 123 to high as shown in the period of time from time T4 to time T5 in FIG. 12E.

As a result, the cutoff frequency of the integrator 123 becomes high as shown in the period between time T4 and time T5 in FIG. 12F, so that the correction amount of the image blur correction (the output of the integrator 123) is controlled to be close to the center of the control range.

At the time T5, when the AF appropriateness does not decrease monotonously and becomes smaller than or equal to a predetermined threshold value, the cutoff frequency of the integrator 123 is returned to Fc_base that is a normal cutoff frequency and the correction effect of image blur correction is set to high.

At the time T6, still image data is generated. At the time T6, in-focus state is realized and the correction effect of image blur correction is high.

As shown at the time T5 in FIG. 12F, the position of the shift lens 112 is located close to the center of the control range and, therefore, it is possible to perform the image bluer correction without causing the shift lens 112 to bump into an end of the control range at the time T6.

As described above, in the present disclosure, the control characteristics of the image blur correction are changed according to the temporal change of the AF appropriateness. Thereby, it is possible to control all the photographing conditions to be in a suitable condition as much as possible. Then, it is possible to generate a good still image with higher probability when generating a still image from a moving image.

(Third Embodiment)

Next, a third embodiment of the present disclosure will be described.

In the second embodiment, the AF appropriateness is referred to, and the control characteristics of the image blur correction can be changed according to the temporal change of the AF appropriateness.

In the third embodiment, a method will be described in which appropriateness of AE control is referred to and control characteristics of AF control and the control characteristics of the image blur correction are changed according to a temporal change of the appropriateness of AE control.

Although the processing is almost the same as the flowchart in FIG. 11, the processing is different from the flowchart in FIG. 11 in a point that the AE appropriateness is used instead of the AF appropriateness and a point that the control characteristics of AF is changed in addition to the cutoff control of the image blur correction control.

FIG. 13A is a graph showing an appropriate exposure value (Ev_target) calculated from a photometric value of AE control and a current appropriate exposure value (Ev_now).

Graphs in FIGS. 13A to 13E show a case in which a composition is changed so that a brighter subject is viewed by, for example, performing panning during photographing.

FIG. 13B shows the AE appropriateness and indicates that the closer to 0, the closer to the appropriate exposure, and the greater the AE appropriateness is, the greater the difference from the appropriate exposure is. Normally, even when the photometric value changes, the AE control does not change the exposure quickly along with the change of the photometric value.

This is because there is a case where an operation occurs in which the brightness of the screen changes periodically due to too sensitive control that changes the exposure along with the photometric value, so that the above AE control is performed to prevent the operation. Therefore, until the AE appropriateness exceeds a predetermined threshold value (from time T11 to time T12), the exposure parameter is maintained without being changed.

The exposure parameter is changed after the AE appropriateness exceeds the predetermined threshold value and control is performed so that the exposure parameter becomes close to Ev_target (from time T12 to time T18).

FIG. 13C shows the AF appropriateness. The closer the AF appropriateness is to 0, the greater the degree of in-focus, and the greater the AF appropriateness, the greater the degree of out-of-focus.

From time T14 to time T15 in FIGS. 13A to 13E, a distance between a camera and a subject is changed by performing panning during photographing and the AF appropriateness increases (changes so as to be out-of-focus).

In the same manner as in the second embodiment, the image capturing characteristic changing unit 105 monitors temporal change of the appropriateness. In the third embodiment, the image capturing characteristic changing unit 105 monitors the AE appropriateness.

When the image capturing characteristic changing unit 105 determines that the AE appropriateness monotonously decreases, the image capturing characteristic changing unit 105 calculates and sets the control characteristics of the image blur correction unit and a driving speed of the focus lens which is the control characteristics of the AF control.

First, at the time T16 in FIG. 13B, when it is determined that the AE appropriateness monotonously decreases, the inclination of the AE appropriateness is calculated (the inclination from time T13 to time T16 in FIG. 13B).

A time Ae_time until the AE appropriateness converges into a predetermined range is calculated from the calculated inclination and the current AE appropriateness. Specifically, the Ae_time is calculated from a difference between the current AE appropriateness and Ae_thresh and the inclination of the AE appropriateness.

Next, the control characteristics of AF control are calculated from the calculated Ae_time. In the AF control, the driving speed of the focus lens 113 according to the Ae_time is calculated and the calculated driving speed is set in the AF control unit 103. The driving speed Af_speed of the focus lens 113 is calculated by the following calculation formula.

$$Af\_speed = K\_af \times M date\_focus / Ae\_time$$

Here, K_af is an arbitrary coefficient. The shorter the Ae_time, the greater the driving speed Af_speed, and the longer the Ae_time, the smaller the driving speed Af_speed.

The greater the current AF appropriateness, the greater the Af_speed is, and the smaller the current AF appropriateness, the smaller the Af_speed is.

In other words, when the evaluation value of the imaging parameter is changing toward a target value of the imaging parameter, the image blur correction control unit 104, which is a changing unit, calculates a prediction time in which the evaluation value becomes appropriate from the magnitude of the evaluation value and the inclination of change of the evaluation value. Then, the image blur correction control unit 104 changes the image blur correction performance of the image blur correction unit according to the prediction time.

Next, the cutoff frequency of LPF used for the calculation of the integrator 123 which is the control characteristics of the image blur correction control is calculated. The cutoff frequency Is_fc is calculated by the following calculation formula.

$$Is\_fc = (K\_is / Ae\_time) + Fc\_base$$

Here, K_is is an arbitrary coefficient. Fc_base is a normal cutoff frequency. According to the above calculation formula, the shorter the Ae_time is, the higher the Is_fc is, and the longer the Ae_time is, the lower the Is_fc is.

The driving speed Af_speed of the focus lens and the cutoff frequency Is_fc of the image blur correction control which are calculated as described above are set in the AF control unit 103 and the image blur correction control unit 104.

At the time T17 in FIGS. 13A to 13E, the driving speed of the focus lens is returned to the original value. In the same manner, at the time T17, the cutoff frequency of the image blur correction control is changed to be gradually returned to the original value.

By performing control in this way, it is possible to cause the AF appropriateness to be close to 0 before the time T18 at which the AE appropriateness becomes the appropriate exposure.

In the same manner also in the image blur correction control, it is possible to return the cutoff frequency to Fc_base of a normal time before the AE appropriateness becomes the appropriate exposure.

After the AE appropriateness becomes appropriate, still image data is generated at the time T19. At this time, it is possible to cause the AF appropriateness to be close to 0 and the cutoff frequency of the image blur correction is in a low state, so that it is possible to generate a good still image with higher probability.

As described above, the characteristics of the AF control and the characteristics of the image blur correction control are changed according to the AE appropriateness.

As a reason to control in this way, there is a control cycle in each control.

In a normal AE control, exposure parameters such as diaphragm, shutter, and gain are changed according to the photometric value obtained from an image, so that from photometry to exposure change, a time corresponding to several frames is required, and for example, in the case of NTSC, a time of several tens ms to several hundreds ms is required.

On the other hand, in the image blur correction, when a camera shake of 1 to 20 Hz is to be corrected, it is required to perform control at a frequency sufficiently higher than the frequency of the camera shake, so that the control cycle of the above is a very short cycle, which is about several hundred micro seconds.

It is desired to employ a configuration in which the characteristics of control of shorter control cycle (for example, the image blur correction control) are changed by referring to the appropriateness of processing of long control cycle (for example, the AE control).

As described above, in the present disclosure, the control characteristics of the image blur correction and the AF appropriateness are changed according to the temporal change of the AF appropriateness.

Thereby, it is possible to control all the photographing conditions to be in a suitable condition as much as possible. Then, it is possible to generate a good still image with higher probability when generating a still image from a moving image.

(Other Embodiments)

It is possible to achieve the object of the present disclosure in the following manner. A storage medium that records a program code of software in which procedures to realize the functions of each embodiment described above are described is supplied to a system or an apparatus.

Then, a computer (or a CPU (central processing unit), MPU (micro processing unit), or the like), which may include one or more processors, of the system or the apparatus reads and executes the program code stored in the storage medium.

In this case, the program code itself read from the storage medium realizes new features of the present disclosure, and the storage medium that stores the program code and a program constitute the present disclosure.

Examples of the storage medium that supplies the program code include a flexible disk, a hard disk, an optical disk, and a magneto-optical disk.

Further, it is also possible to use a CD-ROM, a CD-R, a CD-RW, a DVD-ROM, a DVD-RAM, a DVD-RW, a DVD-R, a magnetic tape, a non-volatile memory card, a ROM, and the like.

The functions of each embodiment described above are realized by making the program code read by a computer to be executable.

Further, the present disclosure includes a case in which OS (operating system) running on a computer performs a part or all of actual processing based on instructions of the program code and the functions of each embodiment described above are realized by the processing.

Further, the present disclosure also includes the following case. First, the program code read from the storage medium is written to a memory included in a function expansion board inserted in the computer or a function expansion unit connected to the computer.

Thereafter, a CPU or the like, which may include one or more processors, included in the function expansion board or the function expansion unit performs a part or all of actual processing based on instructions of the program code.

Further, it is possible to apply the present disclosure to any device, which includes an image capturing apparatus or which connects to an external image capturing apparatus, such as a mobile phone, a personal computer (laptop personal computer, desktop personal computer, tablet personal computer, and the like), and a game machine in addition to a device such as a digital camera, whose main purpose is to capture an image.

Therefore, the "image capturing apparatus" in the present specification is intended to include any electronic device having an image capturing function.

According to the present disclosure, it is possible to provide an image capturing apparatus by which a user can easily generate an optimal image as a still image from a moving image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-087146, filed Apr. 21, 2015, which is hereby incorporated by reference herein in its entirety.

What is claimed is:

1. An image processing apparatus comprising:
   an evaluation unit configured to evaluate validity of an imaging parameter acquired from image data outputted from an image capturing element that captures a subject image and generate an evaluation value of the imaging parameter;
   a generation unit configured to generate shake correction data by using shake data outputted from a shake detection unit;
   a control unit configured to control an image blur correction unit by using the shake correction data;
   a changing unit configured to cause, about a frame image at a time of photographing a moving image, an image blur correction performance of the image blur correction unit in a case of the evaluation value of the imaging parameter being close to a target value of the imaging parameter to be greater than the image blur correction performance of the image blur correction unit in a case of the evaluation value of the imaging parameter being far from the target value of the imaging parameter; and
a recording unit configured to record the frame image whose image blur correction performance exceeds a predetermined threshold value as still image reproduction data,
wherein the imaging parameter is any one of an exposure parameter used for exposure control, a focus state parameter used for focus lens control, and a white balance parameter, and
wherein each unit is implemented by one or more processors, circuitry or a combination thereof.

2. The image processing apparatus according to claim 1, wherein when the evaluation value of the imaging parameter is close to the target value of the imaging parameter, the changing unit decreases the image blur correction performance and thereafter increases the image blur correction performance to be greater than the image blur correction performance before being decreased.

3. The image processing apparatus according to claim 1, wherein when the evaluation value of the imaging parameter is changing toward the target value of the imaging parameter, the changing unit calculates a prediction time in which the evaluation value becomes appropriate from a magnitude of the evaluation value and an inclination of change of the evaluation value and changes the image blur correction performance of the image blur correction unit according to the prediction time.

4. An image capturing apparatus comprising the image processing apparatus according to claim 1 and the image capturing element.

5. An image processing method comprising:
evaluating validity of an imaging parameter acquired from image data outputted from an image capturing element that captures a subject image and generating an evaluation value of the imaging parameter;
generating shake correction data by using shake data outputted from a shake detection unit;
controlling an image blur correction unit by using the shake correction data;
causing, about a frame image at a time of photographing a moving image, an image blur correction performance of the image blur correction unit in a case of the evaluation value of the imaging parameter being close to a target value of the imaging parameter to be greater than the image blur correction performance of the image blur correction unit in a case of the evaluation value of the imaging parameter being far from the target value of the imaging parameter; and
storing a frame to record the frame image whose image blur correction performance exceeds a predetermined threshold value as still image reproduction data,
wherein the imaging parameter is any one of an exposure parameter used for exposure control, a focus state parameter used for focus lens control, and a white balance parameter.

\* \* \* \* \*